Nov. 15, 1966 LE ROY B. SAHLIN 3,285,223

APPARATUS FOR COATING GRANULES

Filed Dec. 9, 1963 2 Sheets-Sheet 1

LE ROY B. SAHLIN
INVENTOR.

BY Sherman J. Kemmer
ATTORNEY

Nov. 15, 1966    LE ROY B. SAHLIN    3,285,223
APPARATUS FOR COATING GRANULES
Filed Dec. 9, 1963    2 Sheets-Sheet 2
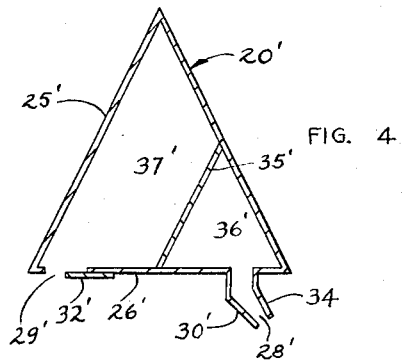
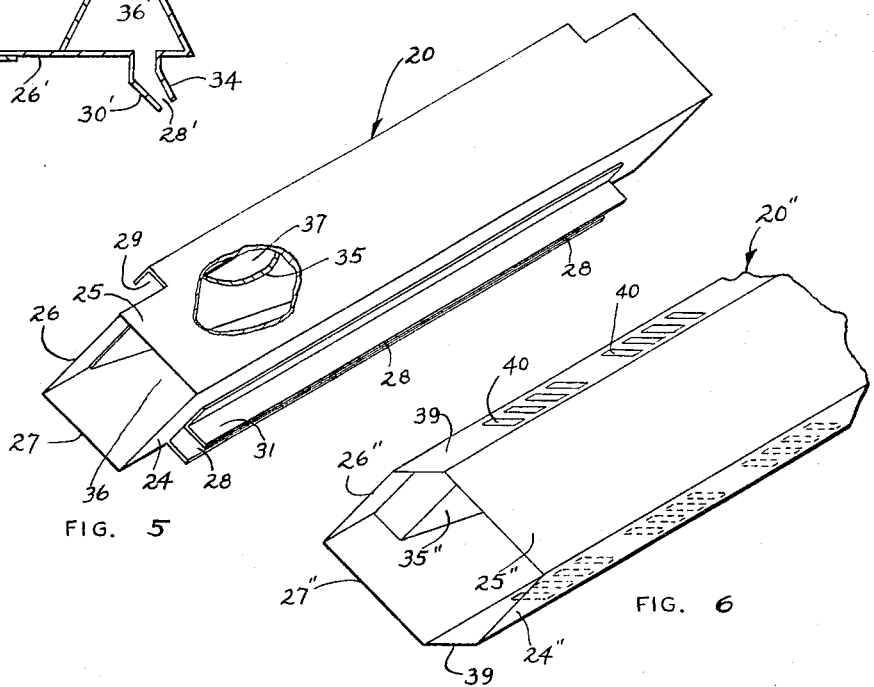
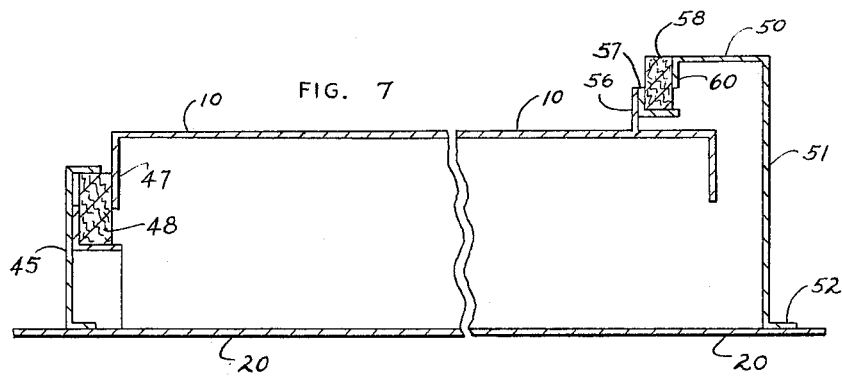
LE ROY B. SAHLIN
INVENTOR.
BY
ATTORNEY

United States Patent Office 3,285,223
Patented Nov. 15, 1966

3,285,223
APPARATUS FOR COATING GRANULES
Le Roy B. Sahlin, Minneapolis, Minn., assignor to Archer-Daniels-Midland Company, Minneapolis, Minn., a corporation of Delaware
Filed Dec. 9, 1963, Ser. No. 328,995
2 Claims. (Cl. 118—64)

This invention relates to a method of coating granular materials and apparatus used therefor. More particularly, this invention relates to a method and apparatus for coating granular materials such as fertilizers, salts of trace elements, pesticides, fungicides, herbicides, and other chemicals, with coating vehicles to thereby encapsulate then granules. The present invention is particularly suitable for uniformly applying, heating and drying intermittently applied coatings.

Numerous methods of drying granular materials are known. There is not, however, a practical commercial method of providing small water soluble granular chemicals with a water resistant coating encapsulating the individual granules. The difficulty has apparently been in providing both an apparatus and a method of uniformly coating each individual granule with a water resistant film without causing agglomeration of the coated granules.

Accordingly, it is an object of this invention to provide a method for coating and encapsulating granular materials with a plurality of coatings by uniformly heating, curing and drying of the wet coated granular materials. It is another object of this invention to provide an apparatus for successively applying, coating and drying a plurality of coatings on granular materials.

The objects of this invention are accomplished with an apparatus which comprises a rotatable drum, a heating means, a blowing means and a drive means for a rotatable drum, said drum being mounted horizontally on rollers and having centrally mounted therein a non-rotatable air duct divided diagonally and longitudinally into two chambers, said chambers having adjustable slot openings for the egress and ingress of air, providing a means of obtaining an equal volume, constant temperature and pressure of air along the entire longitudinal length of the slotted opening, said drum also having therein a liquid spraying means; the apparatus being operated by placing granular material to be coated into the drum, rotating the drum, spraying said granules with an oxidizable and polymerizable liquid coating vehicle, blowing heated air through the drum by means of the air duct to effect the drying, oxidation and polymerization of intermittently applied coatings.

The invention is described more fully with reference to the accompanying drawings, in which, FIG. 1 is a longitudinal elevated view of the apparatus made in accordance with the present invention;

FIG. 4 is a transverse sectional view of an alternate air duct 20';

FIG. 5 is an isometric view of air duct 20 of the apparatus of FIGS. 1 and 2;

FIG. 6 is an isometric view of a modification of the air duct 20 of the apparatus of FIG. 1; and FIG. 7 is a longitudianl partial sectional view of the apparatus of FIG. 1.

Figure 1:
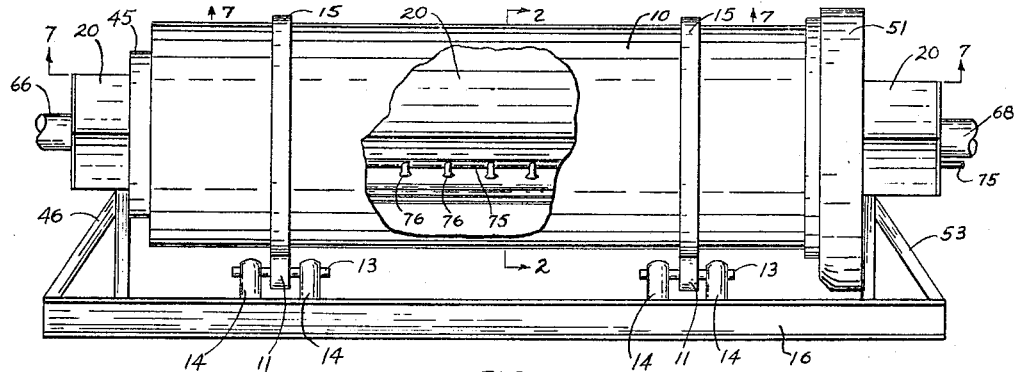

In the embodiment illustrated in FIG. 1, the apparatus comprises a metal cylindrical drum 10 mounted horizontally on support rollers 11, the rollers being mounted on an axle 13 housed in an axle mount 14 which is attached to the base plate 16. The cylindrical drum 10 has two or more supporting ribs 15 circumventing the drum 10. The supporting ribs 15 rest on the support rollers 11. Running longitudinally through the drum is a central air duct 20. The air duct 20 has an inlet tube 68 and an outlet tube 66. The air duct 20 is permanently attached to the end plate 45 and is held in place by the support 46. The opposite end of the cylindrical drum 10 has a removable cover 51 which is held in place by the removable support 53. Inserted through the removable cover 51 is a tube 75 or a bundle of several tubes which projects into the cylindrical drum 10 and traverses the entire length of drum 10 running parallel to air duct 20.

Through the cutaway section of FIGURE 1 can be seen the air duct 20, the tube 75, and liquid spraying nozzels 76.

The apparatus operates by placing the cylindrical drum 10 into rotation by conventional means at a peripheral speed of about 5 to about 150 feet per minute so as to slowly tumble the granulars therein. Heated air is sucked or blown through the inlet tube 68 and passes into one chamber of air duct 20 from which it is expelled into the drum 10 where it circulates and is subsequently exhausted by entering the second chamber of air duct 20 and then passing through outlet tube 66.

The tube 75 or bundle of several tubes is used as the means for injecting or spraying a finely dispersed stream of liquid coating vehicle into drum 10 onto the tumbling granules. The nozzles 76 comprise one or more slit openings on the tube 75 or bundle of tubes, capable of emitting a fine evenly dispersed spray of coating vehicle. Alternately, the liquid coating vehicle can be allowed to flow into the drum through a series of several tubes so as to disperse the liquid throughout the longudinal length of the drum.

Figure 2:
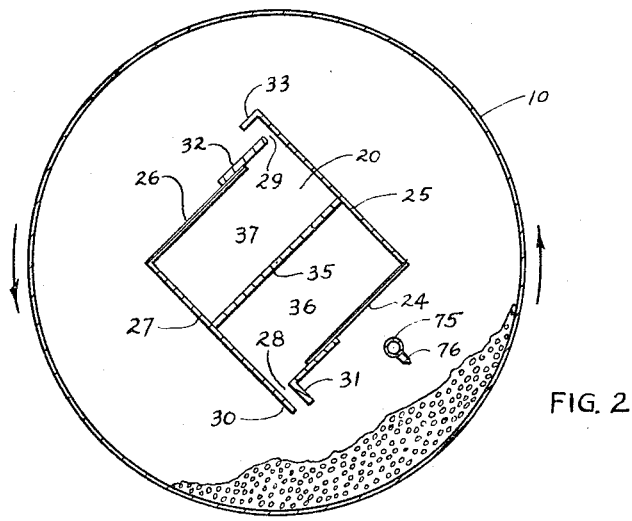
FIG. 2 is a transverse sectional view of the apparatus of FIG. 1.

FIG. 2 is a transverse sectional view of the cylindrical drum 10 of FIG. 1. The internal sidewalls of the cylindrical drum are smooth or may in the alternative have baffles (not shown). The tack of the granulars is, however, sufficient to create a tumbling action without the aid of baffles. The central air duct 20 has sidewalls 24, 25, 26 and 27 and is divided by a partition 35 which runs longitudinally and diagonally through the air duct 20. Attached to sidewall 24 is an adjustable tab 31 which regulates the area of the slotted opening 28. Sidewall 26 also has attached thereto a second adjustable tab 32. The adjustable tabs 31 and 32 are used to balance the air flow through the system.

Projecting from the sidewall 27 is perferably a guide strip 30 which directs the air stream to insure air impingement on the tumbling granules. Projecting from sidewall 25 is a guard 33 which reduces the possibility of granules being carried into the air duct 20 through the slotted opening 29. The movable tube 75 and a nozzle 76 therefor are shown in a space relationship to the air duct 20 and the cylindrical drum 10.

In the operation of the apparatus the drum 10 is filled with granular material to an approximate depth which maintains its level just below the end of the slotted opening 28 as the drum 10 rotates. The drum 10 revolves counterclockwise while heated air enters the air duct 20 where it is channeled into the first chamber 36 to be expelled through the slotted opening 28 into the drum 10. The guide strip 30 and the adjustable tab 31 directs the air stream onto the tumbling granules. The air flow subsequently follows the rotation of the drum 10 to enter the second chamber 37 by means of the slotted opening 29. The air is then exhausted by means of the air duct 20.

Figure 3:
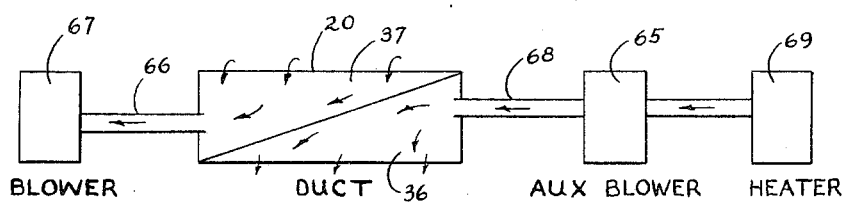
FIG. 3 is a schematic illustrating the air flow in accordance with the present invention.

FIG. 3 is a schematic diagram showing the heater 69, blower 65 which is optional, inlet tube 68, air duct 20, first chamber 36, second chamber 37, outlet tube 66, and blower 67. The air flow is in the direction of the arrows commencing at the heater 69 entering the first chamber of the air duct 20 through the inlet tube 68 passing out of the first chamber 36 and reentering the second chamber 37 to be exhausted through the outlet tube 66 by means of the blower 67. The blower 67 is adapted to create a slight vacuum within the drum 10 (not shown). Blower 65 may be used to increase the flow of air into chamber 36 so as to reduce the amount of vacuum within the drum. However, even when blower 65 is used, it must be regulated to maintain a slight vacuum within the drum.

The heater 69 is capable of uniformly preheating air to a temperature of about 125° F. to about 450° F. so as to maintain an internal drum temperature of about 125° F. to about 400° F. The temperature and the air flow are limited by the explosive limits of the solvent used in the coating vehicle and must be correlated so that the temperature of the solvent-containing exhaust is below its explosive limit.

FIG. 4 shows a transverse sectional view of an alternate construction of the air duct. The triangularly shaped air duct 20' is centrally positioned within the cylindrical drum 10 similar to air duct 20 of FIGS. 1 and 2. The air duct 20' is composed of sidewalls 24', 25' and 26' and is internally divided in a longitudinal and diagonal manner by partition 35' so as to create two separate chambers 36' and 37'. Air enters the first chamber 36' through the main body of the air duct 20' and leaves the chamber 36' through the opening 28' to enter the drum 10 (not shown). The air circulates around the air duct 20' and reenters the second chamber 37' through the slotted opening 29'. The air is exhausted from the second chamber 37' by means of a continuation of the air duct 20'.

Attached to the sidewall 26' is a guide strip 30' which is utilized to direct the flow of air. The area of the slotted opening 28' is regulated by a hinged baffle 34 that is placed parallel to the guide strip 30'. Also attached to sidewall 26' is an adjustable tab 32' which regulates the area of the slotted opening 29'.

By adjusting the baffle 34 and tab 32' the flow of air is balanced throughout the system. The internal design of the air duct 20' provides a means of obtaining an equal volume, constant temperature and pressure of air along the entire longitudinal length of the slotted opening 28'. The first chamber 36', is large enough in proportion to the slotted opening 28' so that a steady stream of air at equal volume and pressure is emitted along the entire length of the slotted opening 28' when a reduced pressure is applied to the drum 10.

The triangular shaped air duct 20' has certain advantages over the rectangular shaped ducts, particularly in less chance of granules being retained on sidewalls 24' and 25' and the ease of removing granules that might stick to the sidewalls.

FIG. 5 is an isometric view of the air duct 20 which is shown in FIGS. 1 and 2.

The adjustable tabs 31 and 32 are used to balance the flow of air through the air duct 20. The internal design of the air duct 20 provides a means of obtaining an equal volume and pressure of air along the entire longitudinal length of the slotted opening 28. The first chamber 36, is large enough in proportion to the slotted opening 28 so that a steady stream of air at equal volume and pressure is emitted along the entire length of the slotted opening 28 when a reduced pressure is applied to the drum 10. Adjustments for changes in the volume and pressure of air are readily made by use of the adjustable tabs 31 and 32 (not shown).

In the operation of the apparatus a volume of air equal to about 1 to about 5 cubic feet of air per minute per pound of granular material is normally used. This volume is dependent on the particle size of the granules, being at the lower limit for the smaller particles so as to avoid carrying granules out through the exhaust. The flow of air is produced by the sucking action of a blower which draws on the second chamber 37 thus creating a slight vacuum in the drum 10. The air flow can also be aided by a second blower which forces air into the first chamber 36, the slight vacuum within the drum being preferably maintained.

FIG. 6 is an isometric view of another design for the air duct 20. This design (designated 20'') has sidewalls 24'', 25'', 26'', 27'' and two angled sides 39 fitted together to form an irregular hexagon which is the outside perimeter of the air duct 20''. The angled sides 39 have adjustable vents 40 for the passage of air. The internal portion of the air duct 20'' is divided longitudinally and diagonally by partition 35'' into two separate chambers. The air flow through the air duct 20'' is similar to that of the air duct 20.

FIG. 7 is a longitudinal sectional view of the upper portion of the apparatus of FIG. 1 showing the removable cover 51, the end plate 45 and the sealing means. The sectional view shows the top of the air duct 20 to which the end cover 45 is permanently attached. The cylindrical drum 10 has a flanged end 47 which is in contact with the sealing gasket 48. The opposite end of the cylindrical drum 10 is enclosed by the removable cover 51. The removable cover 51 has a flange 52 located in the center of it which fits securely about the air duct 20. The outer rim 50 of the removable cover 51 has a flange 60 to which a sealing ring 58 is attached. Welded to the cylindrical drum 10 is a disk shaped ring 56 to which an L-shaped ring 57 is welded. The L-shaped ring 57 forms a seat for the sealing ring 58. The sealing gasket 48 and sealing ring 58 are made of felt, canvas, plastic, rubber or other suitable materials against which the flanged end 47 and flange 60 can freely slide.

The apparatus disclosed herein is particularly applicable to large scale production of encapsulated granules. The apparatus and method are particularly adapted for use in providing prefabricated water soluble granular fertilizers, trace elements required for plant growth, pesticides, fungicides, herbicides, and other chemicals with a series of water insoluble coatings applied in controlled increments of alternate application and drying to surround each of the granules with a water resistant and water insoluble film.

The apparatus disclosed herein is best described as a curing chamber for the oxidation of polymerization of liquid coating vehicles. The internal change in temperature, delta $t$, approaches zero.

The granular materials coated by the apparatus and method of this invention are normally of a particle size of about 0.02 inch to about 0.20 inch. Larger sized granules can also be coated.

The coating vehicles used for the encapsulation procedure may be any rapid drying water insoluble coating vehicle. Preferably, high polymer fatty oil modified alkyd resins, fatty oil dicyclopentadiene copolymers, fatty oil vinyl aromatic polymers and diisocyanate modified fatty oil polymers are the most desirable. The polymer oils are diluted with inexpensive conventional solvents such as mineral spirits, kerosene, xylene and the like so as to give a free flowing liquid having the viscosity of about 0.5 to about 20 stokes at 25° C.

The preferred oils are the copolymers of dicyclopentadiene and a fatty oil. The term fatty oil refers to esters of $C_8-C_{26}$ aliphatic unsaturated acids. Such esters are commonly known as drying and semi-drying oils. Such acids are derived from animal, vegetable and marine oils such as linseed, soya, tall, menhaden, anchovy, tuna, tung, oiticica, safflower, rapeseed, and the like. Most of these natural oils are the glyceride esters of long-chained fatty acids. The glyceride esters are useful in themselves or they may be converted to the esters of such polyols as pentaerythrital, sorbitol and the like. In addition, the fatty oils can be modified with dibasic acids such as maleic acid to increase their drying reactivity.

The decyclopentadiene copolymer oils preferably contain about 10 to about 45 parts by weight of dicyclopentadiene reacted with about 55 to about 90 parts by weight of a previously modified or unmodified unsaturated fatty oil to a viscosity of about 1 to about 100 stokes at 25° C. when reduced to 70% nonvolatile in xylene.

The fatty oil vinyl aromatic copolymers preferred are the reaction product of an unsaturated fatty oil with a vinyl aromatic. The term vinyl aromatic refers to such vinyls as styrene, vinyl toluene, alpha methylstyrene, divinylbenzene, and the like. The vinyl aromatic copolymers are the reaction product of about 10 to about 45 parts by weight of a vinyl aromatic reacted with about 55 to about 90 parts by weight of a previously modified or unmodified unsaturated fatty ester to a viscosity of about 1 to about 100 stokes at 25° C. when reduced to 70% nonvolatile in xylene.

The fatty oil modified alkyds which are useful for the encapsulation procedure of this invention may be long, medium, or short oil alkyd resins as are well known in the art. The preferred fatty oil modified alkyds are the fast drying modifications, generally those having viscosities in the range of about 1 to about 500 stokes at 25° C. and 70% nonvolatile in xylene.

Diisocyanate modified fatty oil polymers are also particularly desirable because of their fast curing rate. The diisocyanate oils which are particularly desirable are the reaction products of about ½% to 6% toluene diisocyanate with about 94% to about 99½% of a dicyclopentadiene fatty oil copolymer, fatty oil modified alkyd resin or vinyl aromatic fatty oil copolymer having retained hydroxyl values sufficient to react with the isocynate groups. The most desirable diisocyanate modified fatty polymers are those having a viscosity in the range of about 1.0 to about 500 stokes at 25° C. and 50% nonvolatile in xylene.

In the coating operation, a calculated amount of liquid coating vehicle diluted with a volatile solvent to a free flowing consistency, is sprayed into the drum as the granulars slowly tumble within the drum. The spraying and drying is carried on alternately and intermittently so as to apply a plurality of coatings to each individual granule. The weight of coatings applied to the granules may be varied considerably. Most practically the amount of resin used in encapsulating the granules will be within the range of about 1% to about 40% resin based on the weight of the granules. The coatings are applied to increments of about ½% to about 10% resin by weight of the granular material.

The following examples have been included to better illustrate the methods employed in the use of this invention.

*Example I*

A plant fertilizer in prefabricated granular size of about 0.05 to 0.10 inch, having a chemical analysis of 10% nitrogen, 10% phosphorus and 10% potassium was encapsulated with a water resistant coating by placing 20 pounds of the granular material into the cylindrical drum of the drying apparatus described. The cylindrical drum used was 30 inches in length and 16 inches in diameter. The drum was set into rotation and a peripheral speed of about 10 feet per minute and the air flow was adjusted to 350 to 375 cubic feet per minute. The air temperature entering drum was controlled at 250° F. One pound of linseed-dicyclopentadiene copolymer oil at 50% nonvolatile in mineral spirits and a viscosity of 3 stokes was sprayed onto the slowly tumbling granular particles. After a period of about 5 to 10 minutes the first coat had dried sufficiently to permit application of a second coat. Again one pound of 50% nonvolatile linseed-dicyclopentadiene copolymer oil was applied. Intermittent coating and drying was continued until the granulars were coated with a total of 14% resin based on the solids.

Upon completion of the coating procedure the encapsulated granulars were allowed to age for about 12 hours. Testing of leaching properties indicated that the coated granulars exhibited the desired slow release properties.

*Example II*

A slow release fertilizer was made by encapsulating shotted urea having a particle size of about 0.02 inch to about 0.09 inch. Twenty pounds of urea was placed in the cylindrical drum as described in Example I. The drum was set into rotation at a peripheral speed of about 21 feet per minute and the air flow was adjusted to 350 to 375 cubic feet per minute. The internal temperature in the drum was regulated at 180° F.

The urea was coated with a 2% diisocyanate modified menhaden-discyclopentadiene copolymer at 40% nonvolatile in mineral spirits. The viscosity was about 3 stokes. The resin was applied by alternately spraying and drying the cascading granulars in increments of 2% resin by weight of the granulars until a total of 20% resin had been applied. The urea particles maintained their individuality, each being separately coated and encapsulated with the resin material. Time intervals between resin applications were 6 minutes.

After aging the coated particles for about 12 hours, leach tests were conducted on the coated granulars and they were found to exhibit the desired slow release properties.

The embodiment of the present invention in which an exclusive property or privilege is claimed are defined as follows:

1. Apparatus for coating granules, said apparatus comprising
   (a) a horizontal rotatable cylindrical drum adapted to hold granules and mounted for rotation about a horizontal axis;
   (b) means for rotating said drum;
   (c) means positioned in said drum for spraying liquid coatings onto granules being tumbled within said drum;
   (d) a nonrotatable air duct centrally mounted within said drum and extending the length thereof; said air duct being divided diagonally along its length into first and second chambers;
   (e) air inlet means communicating with said first chamber;
   (f) air outlet means communicating with said second chamber;
   (g) said first chamber having a single slot opening extending along its length and being adapted to deliver air to the interior of said drum at an equal volume, constant temperature and pressure through said opening along a guided path in a generally downward direction onto granules being tumbled within said drum;
   (h) said second chamber having a single slot opening extending along its length adapted to receive air from the interior of said drum; and
   (i) guard means for said slot opening of said second chamber for preventing falling granules from entering said second chamber through said slots opening.
2. Apparatus of claim 1 wherein the slot openings in said first and second chambers are adjusted to maintain a vacuum within said drum when air is sucked from said drum through said second chamber.

(References on following page)

References Cited by the Examiner

UNITED STATES PATENTS

| | | | |
|---|---|---|---|
| 1,284,787 | 11/1918 | Sartakoff | 34—138 |
| 1,293,780 | 2/1919 | Hornsey | 34—138 |
| 1,645,440 | 10/1927 | McFarland | 34—138 |
| 1,774,168 | 8/1930 | Boyd | 117—100 |
| 2,155,499 | 4/1939 | Lawson | 117—109 |
| 2,253,098 | 8/1941 | Schneider | 34—136 |
| 2,543,776 | 3/1951 | Greisen | 34—134 |
| 2,581,413 | 1/1952 | Hillyer et al. | 117—161 |
| 2,603,611 | 7/1952 | Marling | 117—161 |
| 2,616,863 | 11/1952 | Block et al. | 117—161 |
| 2,647,884 | 8/1953 | Wystrach. | |
| 2,736,288 | 2/1956 | Clay et al. | 118—418 |
| 2,864,780 | 12/1958 | Katz et al. | |
| 2,936,226 | 5/1960 | Kaufman | 117—100 |
| 3,069,293 | 12/1962 | Booth | 117—100 |
| 3,106,492 | 10/1963 | MacDonald et al. | 117—100 |
| 3,141,792 | 7/1964 | Lachman et al. | 117—109 |
| 3,151,027 | 9/1964 | Cooley et al. | 117—100 |
| 3,158,462 | 11/1964 | Wilson | 117—100 |
| 3,167,035 | 1/1965 | Benson | 117—109 |
| 3,185,588 | 5/1965 | Resnick | 117—100 |
| 3,223,518 | 12/1965 | Hansen | 71—64 |

FOREIGN PATENTS 218,079    5/1909    Germany.

WILLIAM D. MARTIN, *Primary Examiner.*

G. L. HUBBARD, M. SOFOCLEOUS,
*Assistant Examiners.*